(12) United States Patent
Katoh et al.

(10) Patent No.: US 10,016,838 B2
(45) Date of Patent: Jul. 10, 2018

(54) FRICTION STIR WELDING TOOL

(71) Applicant: Toshiba Kikai Kabushiki Kaisha, Tokyo (JP)

(72) Inventors: Kouichi Katoh, Gotemba (JP); Masami Aihara, Gotemba (JP); Atsushi Tada, Gotemba (JP); Makoto Sawazaki, Gotemba (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/455,928

(22) Filed: Mar. 10, 2017

(65) Prior Publication Data

US 2017/0266756 A1    Sep. 21, 2017

(30) Foreign Application Priority Data

Mar. 18, 2016  (JP) .................................. 2016-055944
Dec. 1, 2016   (JP) .................................. 2016-233978

(51) Int. Cl.
    *B23K 20/00*    (2006.01)
    *B23K 20/12*    (2006.01)
(52) U.S. Cl.
    CPC ................ *B23K 20/1255* (2013.01)
(58) Field of Classification Search
    CPC ............ B23K 20/1255; B23K 20/1235; B23K 20/125; B23K 20/122; B23K 20/126; B23K 37/06
    USPC ........................................ 228/2.1, 112.1, 2.3
    See application file for complete search history.

(56) References Cited

U.S. PATENT DOCUMENTS 4,725,172 A * 2/1988 Shiina .................. B23Q 16/005
                                                    408/13
2004/0004991 A1* 1/2004 Wu ........................ G01K 11/12
                                                    374/162

FOREIGN PATENT DOCUMENTS

JP    2005-177844    7/2005
JP    2012-000698    1/2012
JP    55-48530       7/2014

OTHER PUBLICATIONS

Computer english translation of JP2012-000698.*
English Language Abstract and Translation of JP 2005-177844 published Jul. 7, 2005.
English Language Abstract and Translation of JP 2012-000698 published Jan. 5, 2012.
English Language Translation (Machine) of JP 55-48530 published Jul. 16, 2014.

* cited by examiner

*Primary Examiner* — Erin B Saad
(74) *Attorney, Agent, or Firm* — DLA Piper LLP US

(57) ABSTRACT

A friction stir welding tool attachable to a spindle of a machine tool includes: a shank connected to the spindle; a chuck connected to the shank through a heat insulating portion; a welding tool connected to the chuck and usable for friction stir welding; and a cooling jacket provided on a circumferential surface of the chuck. The cooling jacket is provided with a refrigerant path for delivering a refrigerant.

4 Claims, 6 Drawing Sheets

FRICTION STIR WELDING TOOL

The entire disclosures of Japanese Patent Application No. 2016-055944 filed Mar. 18, 2016 and Japanese Patent Application No. 2016-233978 filed Dec. 1, 2016 are expressly incorporated by reference herein.

TECHNICAL FIELD

The present invention relates to a friction stir welding tool.

BACKGROUND ART

Recently, friction stir welding has come to be used for joining materials (see Patent Literature 1: JP-2005-177844 A).

In the friction stir welding, a rotating welding tool is pressed onto to-be-joined objects to soften and join the to-be-joined objects with frictional heat.

In the friction stir welding, the welding tool is attached to a spindle of a friction stir welding machine and is rotated around a rotation axis intersecting the surfaces of the to-be-joined objects. Then, the welding tool is moved along a to-be-joined portion on the surfaces of the to-be-joined objects while being rotated.

The friction stir welding machine is often a dedicated device for applying pressure on the objects (i.e. a workpiece) to generate the frictional heat by an axial movement (movement of the tool and/or the workpiece) while rotating the welding tool with a high torque. On the other hand, general-purpose machine tools can replace the friction stir welding machine as far as being used for rotating the spindle, and moving the tool and/or the workpiece.

The usable welding tool includes, for instance, a cylindrical tool body and a conical pin coaxially and downwardly provided on a lower end of the cylindrical tool body. A shoulder defining a step is provided around the pin.

During the progress of the friction stir welding, the pin enters the inside of the to-be-joined objects and the shoulder is kept at a position facing the surfaces of the to-be-joined objects. The friction between the rotating pin and the to-be-joined objects generates a high temperature at the friction portion, whereby the to-be-joined objects are stirred to be joined.

As described above, during the welding operation of the friction stir welding, the temperature of the to-be-joined portion becomes high and the heat is conducted through the welding tool to a spindle of a machine tool.

The dedicated friction stir welding machines have mechanism(s) against the heat from the welding tool. However, general-purpose machine tools are only designed to endure a high temperature caused by the heat conduction to the spindle or the spindle head during a typical machining.

Accordingly, when the friction stir welding is performed with a welding tool attached to a general-purpose machine tool, the spindle, a bearing supporting the spindle and the like mechanism may be adversely affected by the heat conducted to the spindle. Examples of possible adverse effects include: damages on a main bearing of the spindle head; damages on a retainer portion; center runout of the rotation axis due to thermal expansion; and fretting damages at the tapered shank.

SUMMARY OF THE INVENTION

An object of the invention is to provide a friction stir welding tool capable of restraining a heat conduction to a spindle of a machine tool.

A friction stir welding tool according to an aspect of the invention is attachable to a spindle of a machine tool, the friction stir welding tool including: a shank connectable to the spindle; a chuck connected to the shank; a welding tool connected to the chuck and configured to be used for a friction stir welding; and a cooling jacket provided on an outer circumferential surface of the chuck, the cooling jacket defining a refrigerant path configured to deliver a refrigerant.

According to the above aspect of the invention, the refrigerant (e.g. air or coolant) is supplied to the refrigerant path, so that the chuck can be cooled by the refrigerant passing through the cooling jacket. Accordingly, even when the temperature of the welding tool becomes high as the friction stir welding operation progresses, the heat is cooled by the chuck and the heat conduction to the shank and the spindle can be restrained.

In the friction stir welding tool according to the above aspect of the invention, it is preferable that the refrigerant path is connected to a center hole defined in the shank, and the refrigerant is a center-through air or a center-through coolant in the spindle.

According to the above arrangement, the refrigerant can be supplied through the spindle, thereby allowing a rotation of the entire tool together with the spindle and simplifying the structure. Further, since the refrigerant in a form of the center-through air or the center-through coolant usually used in the spindle of machine tools is used, no special refrigerant supply device is necessary.

It should be noted that, when the center hole of the shank is not used in order to supply the refrigerant from an outside to the rotating tool, it is preferable to provide a separate component including a fixed portion connected to the spindle head, through which the refrigerant is capable of being received and delivered to the rotating shank and chuck, like the one used for supplying refrigerant to a through-tool-coolant tool.

In the friction stir welding tool according to the above aspect of the invention, it is preferable that the friction stir welding tool includes a heat insulating portion between the shank and the chuck.

According to the above arrangement, the heat can be blocked by the heat insulating portion even when a heat conduction occurs from the welding tool to the chuck, thereby further restraining the heat conduction to the shank or the spindle.

The heat insulating portion may be, for instance, a connector formed from a heat-insulating material, a heat-insulating structure having a reduced contact area at a contact portion, and the like.

In the friction stir welding tool according to the above aspect of the invention, it is preferable that a contact-prevention dent is defined on a surface of the chuck in contact with the welding tool or on a surface of the welding tool in contact with the chuck.

According to the above arrangement, since the contact area between the welding tool and the chuck is reduced by the dent, the heat conduction from the welding tool to the chuck can be restrained.

The dent is preferably designed to leave a cross-shaped protrusion on an end face of the welding tool or a bottom face of the chuck.

In the friction stir welding tool according to the above aspect of the invention, it is preferable that the shank includes: a tapered portion in contact with the spindle; and a contact-prevention dent provided on a surface of the tapered portion.

According to the above arrangement, since the contact area is reduced by the dent, even when the heat is conducted to the shank, the heat conduction to the spindle can be restrained.

It is effective that the dent is provided at a middle-diameter portion of the tapered portion. For instance, the tapered portion may contact the spindle at two portions (i.e. a large ring portion and a small ring portion, the large ring portion and the small ring portion defining the dent therebetween), or may contact the spindle only at the large ring portion (i.e. the dent is defined by the portion other than the large ring portion).

In the friction stir welding tool according to the above aspect of the invention, it is preferable that the friction stir welding tool includes a temperature marker provided on the circumferential surface of the chuck, the temperature marker being configured to change an appearance thereof according to a temperature of the chuck.

According to the above arrangement, the temperature of the chuck during the operation can be monitored using the temperature marker, so that the adverse influence on the spindle can be prevented in advance by a visual check of an overheat and the like.

The temperature marker preferably changes a color and brightness on the entire surface thereof according to the temperature thereof. With the change in the appearance on the entire surface, the status of the temperature marker can be seen from the outside even when the tool is rotating. Numerical or character display is not preferable for the temperature marker because the numeral(s) and character(s) cannot be read when the tool is rotated. However, if the marker shows stripe patterns continuous in the rotary direction and the status is displayed through the number and width of the stripe patterns, the status of the marker can be seen while the tool is rotated.

According to the above aspect(s) of the invention, a friction stir welding tool capable of restraining a heat conduction to a spindle of a machine tool can be provided.

BRIEF DESCRIPTION OF DRAWING(S)

DESCRIPTION OF EMBODIMENT(S)

Exemplary embodiment(s) of the invention will be described below with reference to the attached drawings.

Figure 1:
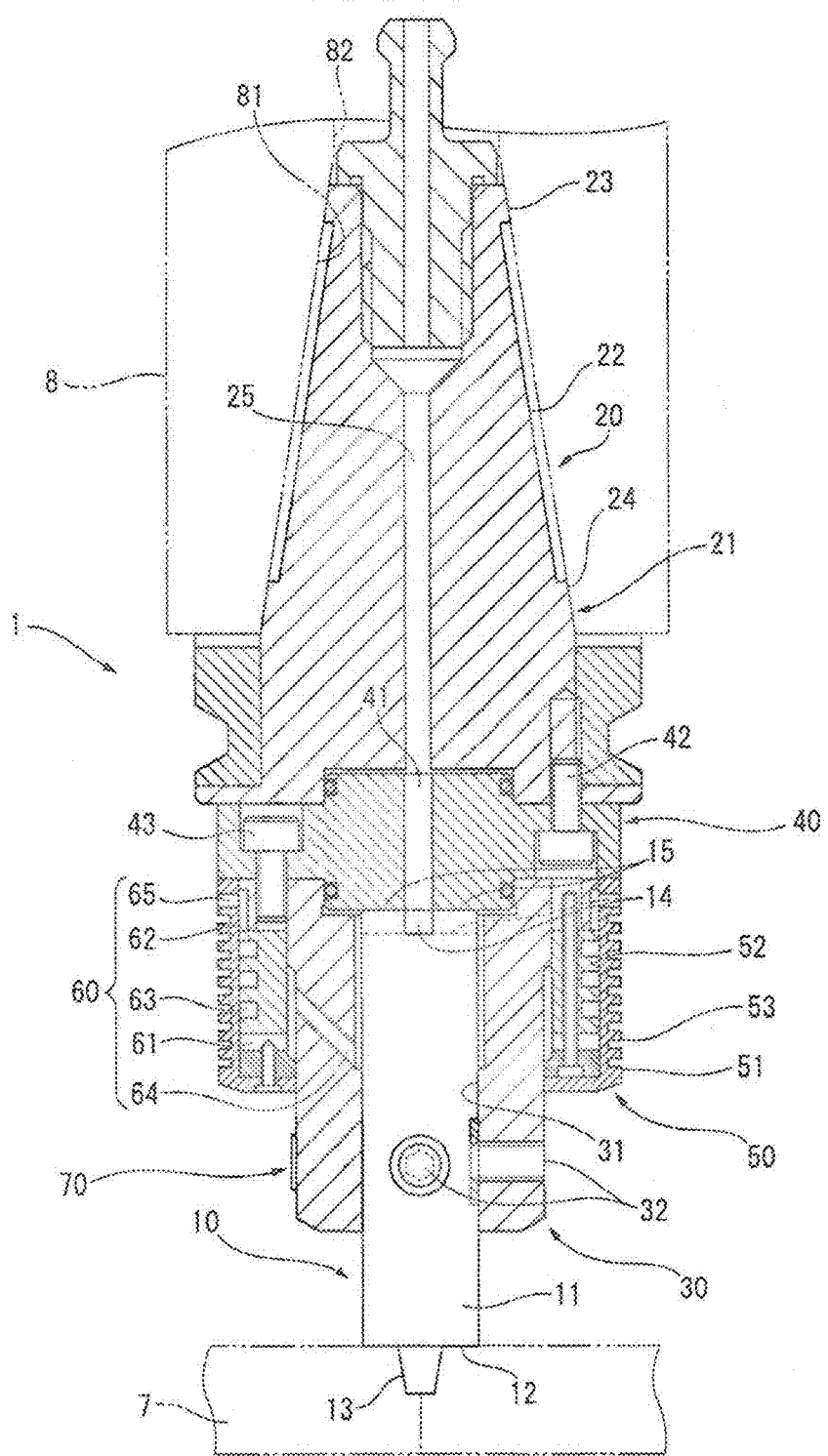
FIG. 1 is a cross section showing an exemplary embodiment of the invention.
Figure 2:
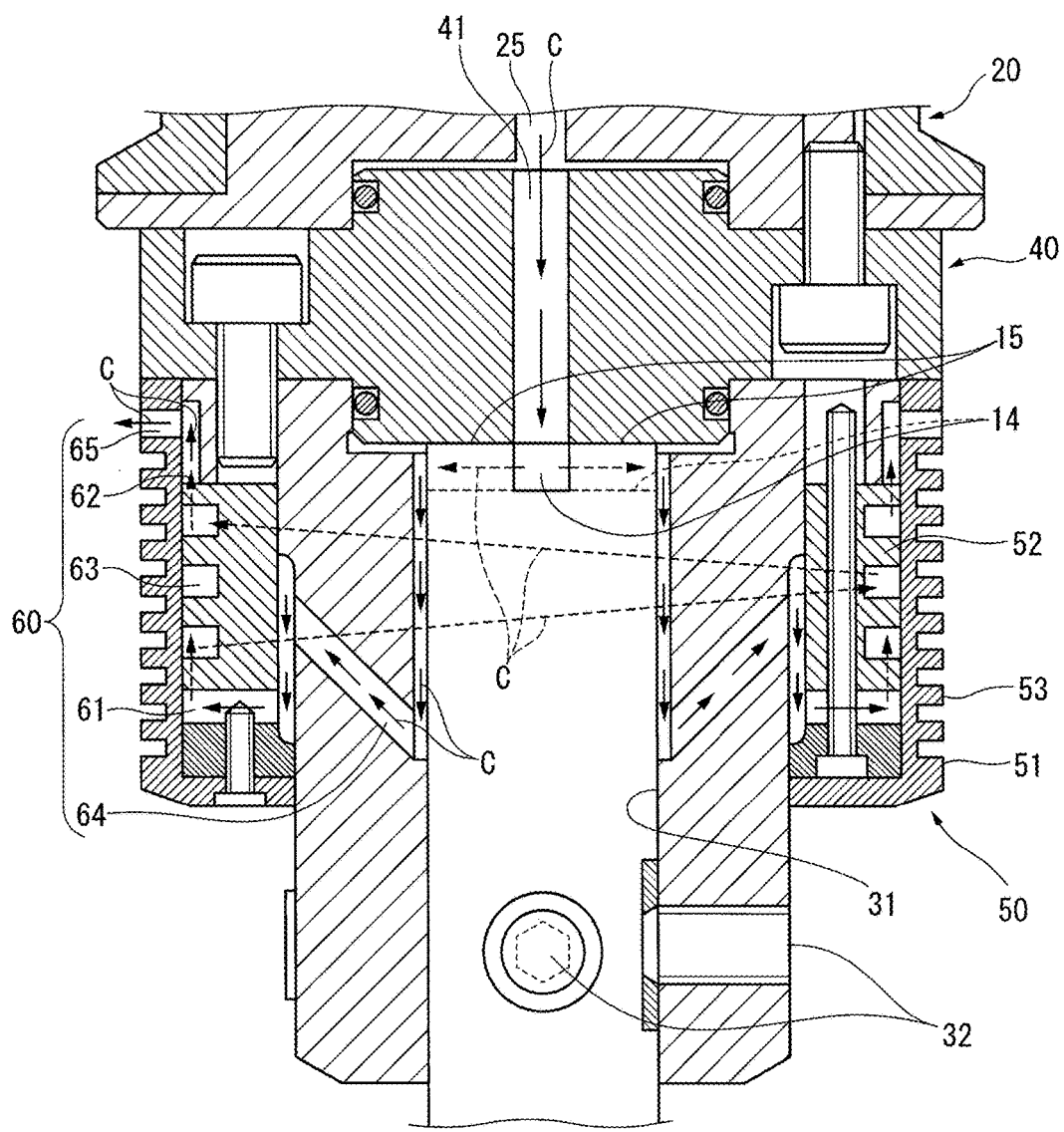
FIG. 2 is an enlarged cross section showing a cooling jacket and a refrigerant path in the exemplary embodiment.
Figure 3:
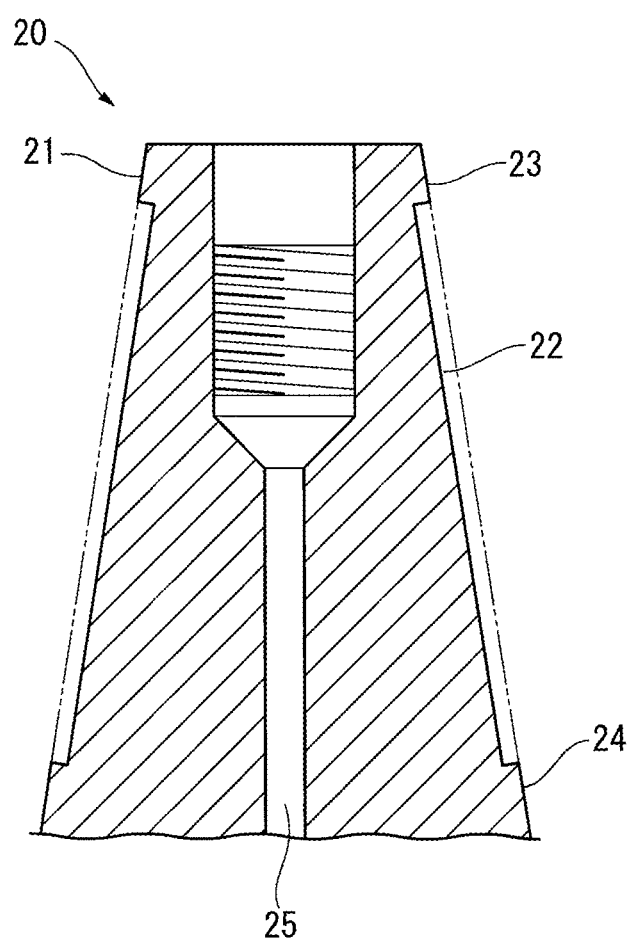
FIG. 3 is a cross section showing a shank of the exemplary embodiment.

As shown in FIGS. 1 and 2, a friction stir welding tool 1 according to the exemplary embodiment is attached to a spindle 8 of a machine tool to perform a friction stir welding of to-be-joined objects 7.

A variety of machine tools are usable for the machine tool of the exemplary embodiment as long as the machine tools are capable of rotating the spindle 8 and moving the spindle 8 with respect to a workpiece (the to-be-joined objects 7 in the exemplary embodiment, or a to-be-cut object when the machine tool is used as a machine tool), in which the spindle 8 and the friction stir welding tool 1 are movable to a desired position with respect to the to-be-joined objects 7.

In the machine tool, the spindle 8 is rotatably supported by the spindle head of the machine tool and is rotated by a motor provided in the spindle head.

The friction stir welding tool 1 includes a shank 20 connected to the spindle 8, a chuck 30 connected to the shank 20, and a welding tool 10 connected to the chuck 30 and used for friction stir welding.

A heat insulating portion 40 is interposed between the shank 20 and the chuck 30. A cooling jacket 50 is provided on a circumferential surface of the chuck 30. A refrigerant path 60, through which a refrigerant is fed, is provided in the cooling jacket 50.

Further, the circumferential surface of the chuck 30 is provided with a temperature marker 70 configured to change an appearance thereof in accordance with a temperature of the chuck 30.

The welding tool 10 is a tool used for friction stir welding and includes a tool body 11, and a shoulder 12 and a pin 13 provided on an end of the tool body 11.

The welding tool 10 is pressed into the to-be-joined objects 7 while being rotated, so that the pin 13 at the end of the welding tool 10 is pressed to enter an inside of the to-be-joined objects 7 while heating and softening a material of the to-be-joined objects 7, whereby a seam between the to-be-joined objects 7 can be joined.

The shank 20 is a 7/24 tapered shank (BT type) for automatic tool replacement according to JISB6339-2:2011 and is attachable to the spindle 8 according to JISB6340-2:2011 corresponding to JISB6339-2:2011.

The shank 20 has a tapered cone 21 (tapered portion) corresponding to a conical profile of a chuck hole 81 of the spindle 8.

As shown in FIG. 1, the tapered cone 21 is provided with a dent 22 at a middle portion of the circumferential surface in a rotary axis direction. A small ring portion 23 is provided on a small-diameter side with respect to the dent 22 and a large ring portion 24 is provided on a large-diameter side with respect to the dent 22.

The small ring portion 23 and the large ring portion 24 defined by the dent 22 are in a form of remaining portions of an original surface of the tapered cone 21 and are projected with respect to the dent 22.

When the shank 20 is attached to the spindle 8, the dent 22 is not in contact with the inner circumferential surface of the chuck hole but only the small ring portion 23 and the large ring portion 24 are in close contact with the chuck hole. Accordingly, the close contact area between the shank 20 and the spindle 8 is as small as a fraction of an area of the whole of the circumferential surface of the tapered cone 21 (i.e. when the tapered cone 21 is in close contact with the chuck hole without the dent 22), whereby the heat conduction between the shank 20 and the spindle 8 is restrained.

The areas, outer diameters and axial widths of the small ring portion 23 and the large ring portion 24 that are in close contact with the chuck hole are sized to be capable of transferring sufficient torque when the friction stir welding is performed with the welding tool 10.

The chuck 30 is a tubular component having a clamp hole 31 capable of receiving the tool body 11. Setscrews 32 are screwed in two directions into the side face of the chuck 30.

The setscrews 32 are tightened while the tool body 11 is inserted into the clamp hole 31, so that the tool body 11 is fixed inside the clamp hole 31 and the welding tool 10 is held on a rotation axis coaxial with those of the chuck 30 and the shank 20.

The heat insulating portion 40 is a cylindrical member interposed between the shank 20 and the chuck 30. The heat insulating portion 40 is fixed with each of the shank 20 and the chuck 30.

The heat insulating portion 40 is made of a low heat conduction material (e.g. ceramics), so that, even when the temperature of the chuck 30 becomes high due to the heat from the welding tool 10, the heat conduction to the shank 20 can be considerably reduced or blocked.

A bolt 42 connecting the heat insulating portion 40 and the shank 20 and a bolt 43 connecting the heat insulating portion 40 and the chuck 30 are independent of each other, so that the low heat conduction material is necessarily present in the heat conduction path between the shank 20 and the chuck 30.

A center hole 41 is provided in the heat insulating portion 40. The center hole 41 is in communication with a center hole 25 of the shank 20.

The welding tool 10 is in contact with the chuck 30, specifically, between the setscrews 32 and the tool body 11 and between the circumferential surface of the tool body 11 opposite the setscrews 32 and the inner circumferential surface of the clamp hole 31.

The contact area between the setscrews 32 and inner circumferential surface of the clamp hole 31 is sufficiently smaller than an entire area of the circumferential surface of the tool body 11, so that the heat conduction from the welding tool 10 can be restrained.

A bottom of the clamp hole 31 of the chuck 30 is opened and the welding tool 10 is received in the clamp hole 31 so that the bottom of the welding tool 10 touches the heat insulating portion 40.

An end face of the tool body 11 of the welding tool 10 is provided with a plus-shaped (+) contact-prevention cut 14 to define four sectorial protrusions 15. The end face of the tool body 11 is in contact only with the protrusions 15, so that the heat conduction is restrained also in the contact portion between the end face of the tool body 11 and the heat insulating portion 40.

The center of the cut 14 of the tool body 11 is in communication with the center hole 41 of the heat insulating portion 40 and with the center hole 25 of the shank 20 through the center hole 41. The cut 14 reaches the outer circumferential surface of the tool body 11, so that the cut 14 is in communication with the gap between the outer circumferential surface of the tool body 11 and the inner circumferential surface of the clamp hole 31.

The cooling jacket 50 includes a case member 51 covering the outer circumferential surface of the chuck 30 and a guide member 52 housed inside the case member 51.

An end of the case member 51 near the welding tool 10 is disposed at a middle position of the circumferential surface of the chuck 30 and an opposite end is connected with the heat insulating portion 40.

A large number of heat release fins 53 are provided on the outer circumferential surface of the case member 51.

The guide member 52 is disposed inside the case member 51 to partition a space defined inside the case member 51 into an introduction portion 61 and a discharge portion 62. A spiral grooves are formed on the outer circumferential surface of the guide member 52 to define a spiral channel 63 between the outer circumferential surface of the guide member 52 and the inner circumferential surface of the case member 51. An end of the spiral channel 63 is in communication with the introduction portion 61 and the other end of the spiral channel 63 is in communication with the discharge portion 62.

The refrigerant path 60 includes the introduction portion 61, the discharge portion 62 and the spiral channel 63 formed in the cooling jacket 50.

The introduction portion 61 is in communication with the clamp hole 31 through a through hole 64 penetrating (from an inside to an outside) through the chuck 30. The clamp hole 31 is in communication with the center hole 25 of the shank 20 though the cut 14 of the welding tool 10 and the center hole 41 of the heat insulating portion 40.

The discharge portion 62 is opened to the outside through an exhaust port 65.

The center hole 25 of the shank 20 is in communication with the center hole 82 of the spindle 8 when the shank 20 is attached to the spindle 8.

In this state, when a refrigerant in a form of center-through air or center-through coolant is supplied from the spindle 8, the coolant passes through the center holes 82, 25, 41 to be introduced into the refrigerant path 60.

As shown in FIG. 2, the refrigerant C having been introduced through the center hole 25 of the shank 20 is guided to the outer circumferential surface of the tool body 11 through the radially-extending cut 14, and is introduced into the through hole 64 through a gap between the outer circumferential surface of the tool body 11 and the inner circumferential surface (i.e. a portion outwardly enlarged with respect to the clamp hole 31) of the chuck 30. The refrigerant C introduced into the through hole 64 passes through the gap between the guide member 52 and the chuck 30 to be introduced into the introduction portion 61.

The refrigerant C introduced into the introduction portion 61 passes through the spiral channel 63 while spending a predetermined time and cooling the chuck 30, and reaches the discharge portion 62 to be discharged through the exhaust port 65.

The temperature marker 70 is disposed at a portion near the welding tool 10 on the outer circumferential surface of the chuck 30.

Figure 4:
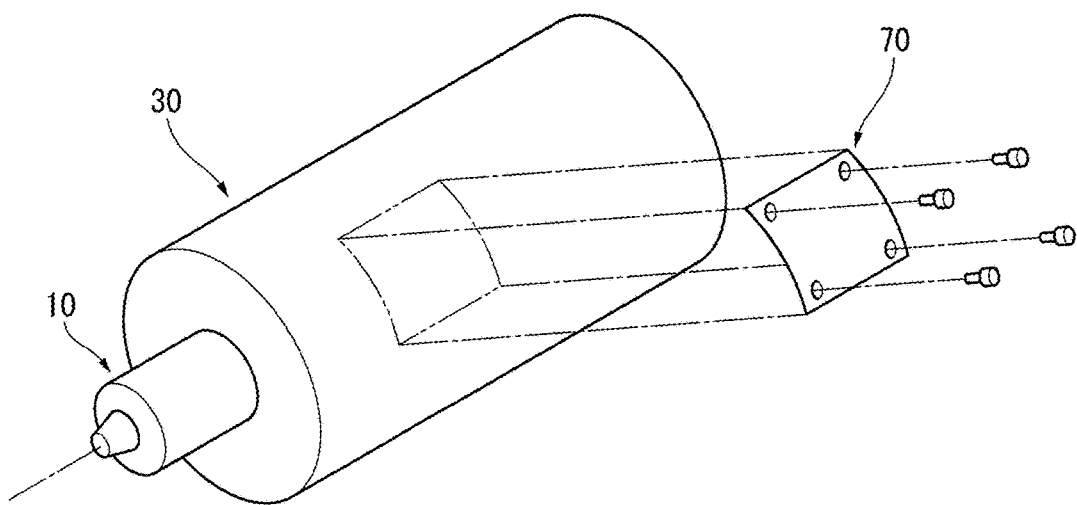
FIG. 4 is a perspective view showing a temperature marker of the exemplary embodiment.

As shown in FIG. 4, the temperature marker 70 is a plate-shaped display panel, which is fixed (e.g. screwed) to the chuck 30.

The temperature marker 70 is a component provided by coating a surface of the panel with a temperature-sensitive material whose color and/or brightness changes according to the temperature, or printing the temperature-sensitive material on the panel. The temperature marker 70 changes the color and/or brightness thereof when the temperature of the chuck 30 is raised by the heat from the welding tool 10, so that the temperature rise can be observed from the outside.

Since the temperature marker 70 is configured so that the color and/or brightness of the entire face of the panel is changed, the temperature marker 70 can be observed from the outside even when the chuck 30 is rotated.

Figure 5:
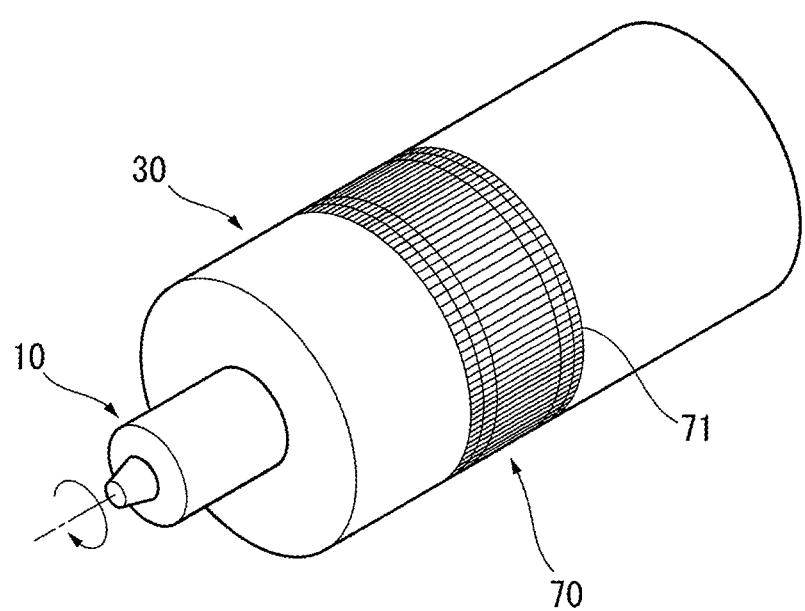
FIG. 5 is a perspective view showing the temperature marker being rotated.

As shown in FIG. 5, since the temperature marker 70 moves at a high speed when the chuck 30 is rotated, the temperature marker 70 is visible in a form of a circumferentially continuous belt-shaped movement locus 71.

At this time, if, for instance, the temperature marker 70 displays characters and the like, it is difficult to read what is indicated by the temperature marker 70. However, since the temperature marker 70 is configured so that the color and/or brightness of the entire face of the panel is changed, the indication of the temperature marker 70 is easily visible in a form of the change in the color and/or brightness of the movement locus 71.

In the exemplary embodiment, the shank 20 is connected to the spindle 8 to attach the friction stir welding tool 1 to the machine tool. Then, the machine tool moves the spindle 8 and the friction stir welding tool 1 so that the welding tool 10 faces the to-be-joined objects 7. In this state, when the spindle 8 is rotated, the shank 20, the chuck 30 and the welding tool 10 are integrally rotated. Subsequently, the welding tool 10 is pressed into the to-be-joined objects 7 to perform the friction stir welding.

At this time, the temperature of the welding tool 10 becomes high due to the friction between the welding tool 10 and the to-be-joined objects 7, and the heat from the welding tool 10 is conducted to the chuck 30.

However, since the mutual contact area between the welding tool 10 and the chuck 30 is limited to be small by the cut 14 (contact-prevention dent) and the protrusions 15, so that the heat conduction from the welding tool 10 can be restrained.

Further, the chuck 30 is provided with the cooling jacket 50 and the refrigerant path 60, so that, even when the heat is conducted from the welding tool 10, the chuck 30 can be cooled.

Furthermore, the heat insulating portion 40 is interposed between the chuck 30 and the shank 20, so that the heat conduction from the welding tool 10 can be restricted or blocked.

The mutual contact area between the shank 20 and the spindle 8 is limited to be small by the presence of the dent 22, so that the heat conduction from the welding tool 10 can be restrained.

As described above, even when the temperature of the welding tool 10 becomes high in accordance with the progress of the friction stir welding, the generated heat can be restrained from being conducted through the chuck 30 and the shank 20 to the spindle 8.

It should be noted that, in order to cool the component using the refrigerant path 60, the center-through air and the center-through coolant may be switchably used depending on the process stages.

For instance, during the friction stir welding operation, the center-through air is delivered into the refrigerant path 60 to cool the chuck 30 using the air. The air having passed through the refrigerant path 60 is discharged into the atmosphere.

After the friction stir welding operation, the center-through coolant in place of the air is delivered into the refrigerant path 60 to cool the chuck 30 using the coolant. The coolant having passed through the refrigerant path 60 flows down from the cooling jacket 50 to be received in a coolant recovery path provided in the machine tool to be recovered in a coolant tank.

With the separate use of the air and the coolant, the coolant is kept from being adhered to the to-be-joined object 7 since the air is used during the friction stir welding operation. Further, after the friction stir welding operation, the component can be cooled within a short time using the coolant. It should be noted that the cooling after the friction stir welding operation can be completed within a shorter time when a coolant cooler is provided in the coolant recovery path or the coolant tank.

Incidentally, it should be understood that the scope of the present invention is not limited to the above-described exemplary embodiment(s) but includes modifications and improvements as long as the modifications and improvements are compatible with the invention.

Existing components can be used for the welding tool 10. The protrusion(s) 15 can be formed on the existing components by providing the cut 14 on an end of the existing components.

The region on the shank 20 at which the dent 22 is provided may be designed as desired in implementing the invention. As described above, it is only required for the small ring portion 23 and the large ring portion 24 that are in close contact with the chuck hole to have an area, outer diameter and axial width are sized to be capable of transferring sufficient torque when the friction stir welding is performed with the welding tool 10.

It is not always necessary for the shank 20 to have both of the small ring portion 23 and the large ring portion 24.

Figure 6:
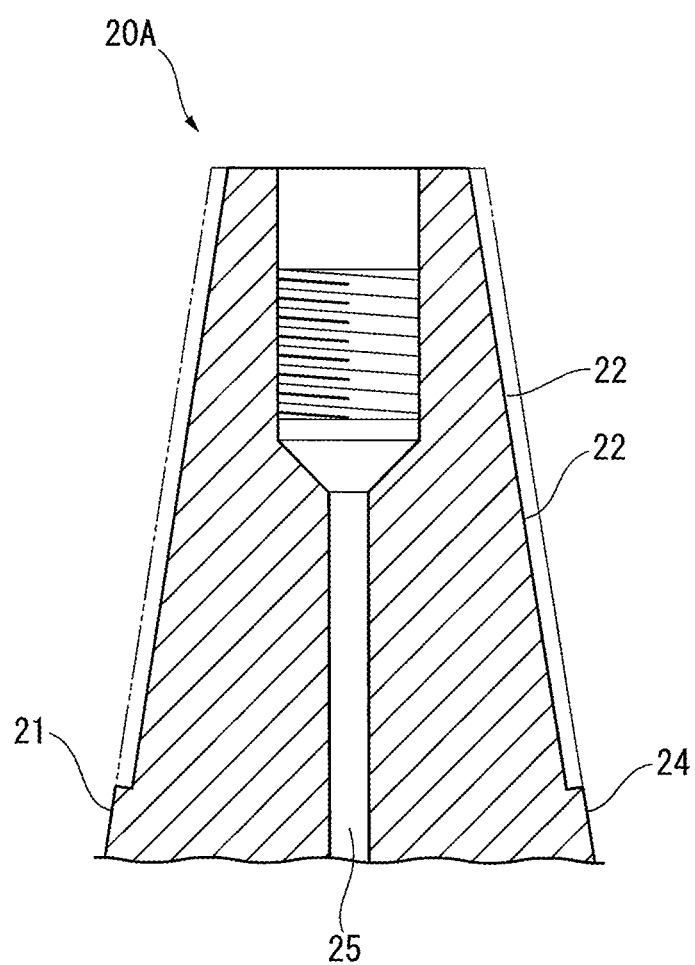
FIG. 6 is a cross section showing a shank of another exemplary embodiment.

FIG. 6 shows a shank 20A having the tapered cone 21 provided with the dent 22 extending to a small-diameter end of the tapered cone 21, thus defining only the large ring portion 24 on the large-diameter end of the tapered cone 21.

Though the shank 20A is in contact with the spindle 8 only at the large ring portion 24, the shank 20A can be held appropriately in the axial direction when the large ring portion 24 has a predetermined or more length in the rotary axial direction.

Further, it is not always necessary for the invention to reduce the contact area of the shank 20 using the dent 22 but the dent 22 may be omitted as necessary.

The heat insulating portion 40 is not necessarily a solid component made from a low-friction material, but may be provided by a hollow component or may be provided using other heat insulating component(s) in combination.

Further, the heat insulating portion 40 is not requisite for the invention but may be omitted.

The arrangements of the cooling jacket 50 and the refrigerant path 60 are not necessarily configured as described in the exemplary embodiment. For instance, the heat release fin 53 for air-cooling may be omitted as necessary.

It is not requisite to use the refrigerant path 60 in a form of the spiral channel 63. However, the time for the refrigerant to pass through the refrigerant path 60 can be prolonged by the spiral circulation and the cooling effect of the refrigerant can be enhanced.

The guide member 52 is not requisite but the cooling jacket 50 may be a simple hollow member.

The refrigerant delivered into the refrigerant path 60 is not necessarily the center-through air or the center-through coolant supplied from the spindle 8 and is not necessarily delivered through the center holes 82, 25, 41 of the respective components.

What is claimed is:

1. A friction stir welding tool constructed and arranged to be attached to a spindle of a machine tool, the friction stir welding tool comprising:
   a shank constructed and arranged to connect to the spindle;
   a chuck connected to the shank;
   a heat insulating portion separating the shank from the chuck;
   a friction stir welding tool connected to the chuck; and
   a cooling jacket provided on an outer circumferential surface of the chuck, the cooling jacket defining a refrigerant path that delivers a refrigerant, wherein:
   the refrigerant path is connected to a first center hole defined in the shank,
   the refrigerant is a center-through air or a center-through coolant in the spindle; and the heat insulating portion is a solid component provided with a second center hole in communication with the first center hole of the shank.

2. The friction stir welding tool according to claim 1, wherein a contact-prevention dent is defined on a surface of the welding tool that is in contact with the chuck.

3. The friction stir welding tool according to claim 1, wherein the shank comprises: a tapered portion in contact with the spindle; and a contact-prevention dent provided on a radially outer surface of the tapered portion.

4. The friction stir welding tool according to claim 1, further comprising a temperature marker provided on the circumferential surface of the chuck, the temperature marker being configured to change an appearance thereof according to a temperature of the chuck.

* * * * *